(12) United States Patent
Li et al.

(10) Patent No.: US 11,381,363 B2
(45) Date of Patent: Jul. 5, 2022

(54) SIGNAL TRANSMISSION METHOD AND APPARATUS

(71) Applicant: HUAWEI TECHNOLOGIES CO., LTD., Shenzhen (CN)

(72) Inventors: Junchao Li, Shanghai (CN); Chi Zhang, Shanghai (CN); Zhengwei Gong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 167 days.

(21) Appl. No.: 16/503,514

(22) Filed: Jul. 4, 2019

(65) Prior Publication Data

US 2019/0356448 A1    Nov. 21, 2019

Related U.S. Application Data

(63) Continuation of application No. PCT/CN2017/118354, filed on Dec. 25, 2017.

(30) Foreign Application Priority Data

Jan. 5, 2017    (CN) .......................... 201710008292.7

(51) Int. Cl.
  *H04L 5/00*    (2006.01)
  *H04W 76/11*   (2018.01)
  (Continued)

(52) U.S. Cl.
  CPC ........ *H04L 5/0051* (2013.01); *H04L 25/0226* (2013.01); *H04L 27/2607* (2013.01);
  (Continued)

(58) Field of Classification Search
  CPC ............. H04L 25/0226; H04L 27/2607; H04L 5/0007; H04L 5/0037; H04L 5/0051; H04L 5/0094; H04W 76/11; H04W 80/08
  See application file for complete search history.

(56) References Cited

U.S. PATENT DOCUMENTS 9,277,539 B2 *    3/2016   Lim ...................... H04W 8/005
10,873,489 B2 *  12/2020   Kim .................... H04L 27/2607
(Continued)

FOREIGN PATENT DOCUMENTS

CN    101827444 A    9/2010
CN    102065557 A    5/2011
(Continued)

OTHER PUBLICATIONS

SAMSUNG:"RS Design for Cross-link Interference in Dynamic TDD", 3GPP Draft; R1-1612564, Nov. 13, 2016, XP051176509, 4 pages.

(Continued)

*Primary Examiner* — Awet Haile

(57) ABSTRACT

Embodiments of this application provide a signal transmission method and apparatus. The method includes: receiving, by a terminal device, configuration information sent by a network device, where the configuration information is used to instruct the terminal device to send a reference signal, and a resource used to transmit the reference signal is determined based on a public cell identity of a cell to which the terminal device belongs; and sending, by the terminal device, the reference signal based on the configuration information by using the resource. According to the signal transmission method and apparatus in the embodiments of this application, an existing reference signal can be used to perform interference/channel measurement between terminal devices, so that a terminal device on a receiving side can distinguish between interference cells while reference signal utilization is improved.

20 Claims, 8 Drawing Sheets

(51) Int. Cl.
*H04L 25/02* (2006.01)
*H04W 80/08* (2009.01)
*H04L 27/26* (2006.01)

(52) U.S. Cl.
CPC ............ *H04W 76/11* (2018.02); *H04W 80/08* (2013.01); *H04L 5/0007* (2013.01)

(56) References Cited

U.S. PATENT DOCUMENTS

| | | | |
|---|---|---|---|
| 2012/0243500 A1* | 9/2012 | Chandrasekhar ..... | H04W 72/02 370/330 |
| 2013/0028134 A1 | 1/2013 | Wang et al. | |
| 2015/0071196 A1* | 3/2015 | Park .................... | H04W 72/042 370/329 |
| 2015/0171948 A1 | 6/2015 | Xiao et al. | |
| 2016/0249348 A1* | 8/2016 | Kang ................ | H04W 72/0413 |
| 2017/0265155 A1* | 9/2017 | Kim .................... | H04W 56/001 |

FOREIGN PATENT DOCUMENTS

| | | |
|---|---|---|
| CN | 103220791 A | 7/2013 |
| CN | 104581961 A | 4/2015 |
| CN | 105472529 A * | 4/2016 |
| EP | 2536087 A1 | 12/2012 |
| WO | 2015065077 A1 | 5/2015 |

OTHER PUBLICATIONS

Huawei et al, Discussion on TRP-to-TRP interference mitigation schemes. 3GPP TSG RAN WG1 Meeting #86BIS Lisbon, Portugal Oct. 10-14, 2016, R1-1608830, 4 pages.

Huawei et al, Discussion on UE-to-UE interference mitigation schemes. 3GPP TSG RAN WG1 Meeting #86bis Lisbon, Portugal, Oct. 10-14, 2016, R1-1608831, 3 pages.

Qualcomm Incorporated, Advanced Frame Structure. 3GPP TSG-RAN WG1 #86bis Oct. 10-14, 2016 Lisbon, Portugal, R1-1610132, 9 pages.

Samsung, Dynamic TDD Cross-link Interference Detection and Reporting. 3GPP TSG RAN WG1 #87 Reno, USA Nov. 14-18, 2016, R1-1612562, 3 pages.

\* cited by examiner

SIGNAL TRANSMISSION METHOD AND APPARATUS

CROSS-REFERENCE TO RELATED APPLICATIONS

This application is a continuation of International Application No. PCT/CN2017/118354, filed on Dec. 25, 2017, which claims priority to Chinese Patent Application No. 201710008292.7, filed on Jan. 5, 2017. The disclosures of the aforementioned applications are hereby incorporated by reference in their entireties.

TECHNICAL FIELD

Embodiments of this application relate to the communications field, and more specifically, to a signal transmission method and apparatus.

BACKGROUND

With the development of wireless network technologies, services are unceasingly emerging, resulting in increasing demands for wireless resources. To adapt to a rapid change in characteristics of uplink and downlink services in a small-coverage network, a dynamic time division duplex (D-TDD) technology has become one of key technologies of next generation mobile communication. D-TDD means that uplink/downlink switching is flexibly and rapidly performed on a subframe or slot in time division duplex (TDD) based on a load status of uplink and downlink services in a network, to meet a specific service requirement in the network and improve a throughput of the uplink and downlink services in the network. The 3rd Generation Partnership Project (3GPP) preliminarily completed enhanced interference management and traffic adaptation (eIMTA) standardization in the Rel-12 phase. Currently, the 3GPP has begun to develop a 5th generation (5G) network new radio (NR) standard, and D-TDD is one of important characteristics of NR.

However, in D-TDD, co-channel cross interference exists between neighboring cells. This includes interference from downlink transmission of a co-channel base station serving a neighboring cell to uplink reception of a base station serving a cell; and interference from uplink transmission of user equipment (UE) in a neighboring cell to downlink reception of UE in a cell. To better achieve an advantage of flexible and efficient performance of the D-TDD technology and effectively improve a D-TDD performance gain, a series of sensing signals usually need to be sent or received between base stations or user equipments. Interference/channel measurement performed between base stations has relatively small impact on an access link. Therefore, a non-standardized method may usually be designed for the interference/channel measurement perform between base stations, and the interference/channel measurement does not need to be standardized. How to configure a reference signal to perform inter-UE interference/channel measurement has become an urgent problem that needs to be resolved in the art.

SUMMARY

Embodiments of this application provide a signal transmission method and apparatus, so that an existing reference signal can be used to perform interference/channel measurement between terminal devices, and a terminal device on a receiving side can distinguish between interference cells while reference signal utilization is improved.

According to a first aspect, a signal transmission method is provided, including: receiving, by a terminal device, configuration information sent by a network device, where the configuration information is used to instruct the terminal device to send a reference signal, and a resource used to transmit the reference signal is determined based on a public cell identity of a cell to which the terminal device belongs; and sending, by the terminal device, the reference signal based on the configuration information by using the resource.

Specifically, the network device may add the higher-layer-generated configuration information onto a physical channel, and then send the configuration information to the terminal device through the physical channel. The configuration information is used to instruct the terminal device to send the reference signal, and the resource used to transmit the reference signal is determined by the terminal device based on the public cell identity of the cell to which the terminal device belongs. After receiving the configuration information sent by the network device, the terminal device determines, based on the configuration information, the resource for sending the reference signal, and sends the reference signal by using the resource.

It should be understood that the sending, by the terminal device, the reference signal means that the terminal device sends the reference signal to another terminal device in a neighboring cell, and the reference signal is used to perform interference/channel measurement between the terminal devices.

According to the signal transmission method in this embodiment of this application, the network device sends the configuration information to the terminal device, and after receiving the configuration information, the terminal device sends the reference signal based on the public cell identity of the cell to which the terminal device belongs. In this way, an existing reference signal can be used to perform interference/channel measurement between terminal devices, and a terminal device on a receiving side can distinguish between interference cells while reference signal utilization is improved.

In a first possible implementation of the first aspect, the resource used to transmit the reference signal includes at least one of the following: a symbol used to transmit the reference signal, a subcarrier used to transmit the reference signal, a cyclic shift of the reference signal, and an orthogonal cover code of the reference signal.

Specifically, the resource used to transmit the reference signal may include at least one of a time domain resource, a frequency domain resource, a code domain resource, and a space domain resource. The four types of resources are specifically the symbol used to transmit the reference signal, the subcarrier used to transmit the reference signal, the cyclic shift of the reference signal, and the orthogonal cover code of the reference signal. It should be understood that, in addition to the four types of resources, the resource used to transmit the reference signal may further include another resource. This is not limited in this embodiment of this application.

It should be understood that the symbol used to transmit the reference signal and the subcarrier used to transmit the reference signal are corresponding to a time-frequency resource, and may be specifically a resource element (RE) used to transmit the reference signal.

With reference to the foregoing possible implementation of the first aspect, in a second possible implementation of the first aspect, the reference signal is a first-type reference signal and/or a second-type reference signal, the first-type reference signal is a sounding reference signal SRS or a first demodulation reference signal DMRS, and the second-type reference signal is a channel state information-reference signal CSI-RS or a second demodulation reference signal DMRS.

Specifically, a resource element corresponding to the reference signal is used for physical layer transmission and does not carry information from a higher layer. It should be understood that there are a plurality of reference signals used for uplink and downlink transmission between the network device and the terminal device. In an existing LTE standard, uplink reference signals include a sounding reference signal (SRS) and a first demodulation reference signal (DMRS), where the SRS may be used for uplink channel measurement, and the first DMRS may be used for uplink control/data demodulation; and downlink reference signals include a cell-specific reference signal (CRS), a channel state information-reference signal (CSI-RS), and a second demodulation reference signal DMRS, where the CRS may be used for downlink control/data demodulation/downlink channel measurement, the CSI-RS may be used for downlink channel measurement, and the second DMRS may be used for downlink control/data demodulation.

With reference to the foregoing possible implementations of the first aspect, in a third possible implementation of the first aspect, a cyclic prefix (CP) of the reference signal is a normal CP.

It should be understood that, using LTE as an example, a normal CP is a CP whose length is about 6.67% of a symbol length. For subcarrier spacings of different reference signals, normal CPs are of different lengths. For example, when a subcarrier spacing of a reference signal is 15 KHz, a length of a normal CP is 4.687 µs; when a subcarrier spacing of a reference signal is 60 KHz, a length of a normal CP is 1.172 µs; and when a subcarrier spacing of a reference signal is 120 KHz, a length of a normal CP is 0.586 µs.

In this embodiment of this application, the normal CP is used, so as to reduce measurement overheads and ensure that more guard intervals are reserved, thereby improving transmission efficiency.

With reference to the foregoing possible implementations of the first aspect, in a fourth possible implementation of the first aspect, the configuration information is carried by dynamic signaling or higher layer signaling.

It should be understood that the dynamic signaling may be carried on a physical downlink control channel (PDCCH), and the higher layer signaling may be a system message (master information block (SIB)) or may be radio resource control (radio resource control (RRC)) signaling. This is not limited in this embodiment of this application.

With reference to the foregoing possible implementations of the first aspect, in a fifth possible implementation of the first aspect, the sending, by the terminal device, the reference signal based on the configuration information by using the resource includes: after receiving the configuration information, determining, by the terminal device, the resource based on the public cell identity of the cell to which the terminal device belongs; and sending, by the terminal device, the reference signal by using the resource.

Specifically, the terminal device receives the configuration information sent by the network device, and determines, based on the configuration information, that the reference signal is used for interference/channel measurement between terminal devices. When the terminal device is a sender, the terminal device may determine, based on the public cell identity, the resource used to send the reference signal, and send the reference signal by using the resource.

Optionally, the public cell identity of the cell to which the terminal device belongs may be a physical cell identity (PCI) of the cell to which the terminal device belongs, or may be another configuration-based identity. This is not limited in this embodiment of this application.

Optionally, that the terminal device determines the public cell identity of the cell to which the terminal device belongs may specifically include two cases: If the public cell identity is the PCI, the PCI may be determined by the terminal device based on a synchronization signal during cell synchronization. If the public cell identity is the another configuration-based identity, the identity may be configured by the network device for the terminal device by using broadcast signaling or higher layer signaling.

It should be understood that the public cell identity may be alternatively determined based on a result of negotiation between network devices. The result is delivered to a terminal device in each cell by using physical layer signaling or higher layer signaling.

It should be further understood that, when two cells are geographically close to each other and reference signals from the two cells are quasi-co-located (QCL), the two cells may use a same public cell identity. However, this is not limited in this embodiment of this application. Herein, that the reference signals are QCL indicates that the reference signals have similar large-scale fading characteristics such as Doppler shifts, Doppler spreads, average delays, and/or time-domain spreads.

With reference to the foregoing possible implementation of the first aspect, in a sixth possible implementation of the first aspect, the determining, by the terminal device, the resource based on the public cell identity of the cell to which the terminal device belongs includes: calculating, by the terminal device, a resource index of the resource according to a predefined criterion based on the public cell identity of the cell to which the terminal device belongs; and determining, by the terminal device, the resource based on the resource index of the resource.

It should be understood that a resource index is a unique identifier used to determine a resource. Usually, resources are numbered, and a number corresponding to each resource is an index of the resource. The network device and/or the terminal device may determine, based on a resource index, a resource corresponding to the resource index. A correspondence between a resource index and a resource may be pre-stipulated in a protocol.

With reference to the foregoing possible implementations of the first aspect, in a seventh possible implementation of the first aspect, the resource is determined by the terminal device from at least one candidate resource based on the public cell identity of the cell to which the terminal device belongs and a first mapping relationship, the first mapping relationship is used to indicate a correspondence between at least one public cell identity and the at least one candidate resource, and the at least one public cell identity includes the public cell identity of the cell to which the terminal device belongs.

Specifically, the resource used to transmit the reference signal may be independently determined, or may be predefined in a protocol. In this embodiment of this application, feasible resource combinations, such as a combination of a subcarrier, a symbol, and an OCC, and a combination of a subcarrier and a symbol, may be predefined in the protocol, and a number is predefined for each combination.

Optionally, the terminal device may use a cell-level orthogonal reference signal. To be specific, all terminal devices in a given cell send a same measurement reference signal on a same time-frequency resource, and time-frequency resources and/or measurement reference signals used by terminal devices in different cells are orthogonal/ quasi-orthogonal. A terminal device on a sending side uses a public cell identity to determine a resource used for a reference signal, and reference signals between cells are orthogonal. In this way, a terminal device on a receiving side can distinguish, through simple operation, between reference signals for which a same time-frequency resource is used and that are from different cells, so that measurement efficiency is improved.

With reference to the foregoing possible implementations of the first aspect, in an eighth possible implementation of the first aspect, the sending, by the terminal device, the reference signal based on the configuration information by using the resource includes: sending, by the terminal device, the reference signal to at least one other terminal device based on the configuration information by using the resource.

With reference to the foregoing possible implementations of the first aspect, in another possible implementation of the first aspect, the configuration information is further used to indicate whether the reference signal of the terminal device is used for interference/channel measurement between terminal devices, and when the configuration information indicates that the reference signal of the terminal device is used for interference/channel measurement between terminal devices, the first configuration information is further used to indicate whether the terminal device is a sender or a receiver.

Specifically, for a configuration result of the configuration information, there may be the following three cases:

(1) When the configuration information is used to indicate that the reference signal of the terminal device is used for interference/channel measurement between terminal devices, and indicate that the terminal device is a sender, the terminal device sends the reference signal.

(2) When the configuration information is used to indicate that the reference signal of the terminal device is used for interference/channel measurement between terminal devices, and indicate that the terminal device is a receiver, the terminal device receives the reference signal sent by another terminal device in a neighboring cell, and performs interference/channel measurement between the terminal devices based on the reference signal. Optionally, the terminal device may feed back, based on the configuration information, measured channel state information to the network device to which the terminal device belongs.

(3) When the configuration information is used to indicate that the reference signal of the terminal device is not used for interference/channel measurement between terminal devices, in other words, when the configuration information is used to indicate that the reference signal of the terminal device is used for uplink or downlink measurement between the terminal device and the network device, the terminal device sends an uplink reference signal or receives a downlink reference signal based on the configuration information.

It should be understood that the reference signals configured in case (1) and case (2) are used for interference/ channel measurement between terminal devices, and in the two cases, the reference signal sent or received by the terminal device may be an uplink reference signal or may be a downlink reference signal. This is not limited in this embodiment of this application. However, in case (3), the reference signal configured by the network device is used for uplink or downlink measurement. If the terminal device is a sender, a reference signal sent by the terminal device is inevitably an uplink reference signal. If the terminal device is a receiver, a reference signal received by the terminal device is inevitably a downlink reference signal.

It should be understood that, in this embodiment of this application, the configured reference signal is a reference signal in an NR system. The reference signal in the NR system may be the same as or be different from a reference signal in an existing LTE system. Therefore, in this embodiment of this application, no limitation is imposed on the reference signal used to perform interference measurement between terminal devices.

According to a second aspect, another signal transmission method is provided, including: adding, by a network device, configuration information onto a physical channel, where the configuration information is used to instruct a terminal device to send a reference signal, and a resource used to transmit the reference signal is determined based on a public cell identity of a cell to which the terminal device belongs; and sending, by the network device, the configuration information to the terminal device through the physical channel.

According to the signal transmission method in this embodiment of this application, the network device sends the configuration information to the terminal device, and after receiving the configuration information, the terminal device sends the reference signal based on the public cell identity of the cell to which the terminal device belongs. In this way, an existing reference signal can be used to perform interference/channel measurement between terminal devices, and a terminal device on a receiving side can distinguish between interference cells while reference signal utilization is improved.

In a first possible implementation of the second aspect, the resource used to transmit the reference signal includes at least one of the following: a symbol used to transmit the reference signal, a subcarrier used to transmit the reference signal, a cyclic shift of the reference signal, and an orthogonal cover code of the reference signal.

With reference to the foregoing possible implementation of the second aspect, in a second possible implementation of the second aspect, the reference signal is a first-type reference signal and/or a second-type reference signal, the first-type reference signal is a sounding reference signal (SRS) or a first demodulation reference signal (DMRS), and the second-type reference signal is a channel state information-reference signal (CSI-RS) or a second demodulation reference signal (DMRS).

With reference to the foregoing possible implementations of the second aspect, in a third possible implementation of the second aspect, a cyclic prefix (CP) of the reference signal is a normal CP.

With reference to the foregoing possible implementations of the second aspect, in a fourth possible implementation of the second aspect, the configuration information is carried by dynamic signaling or higher layer signaling.

With reference to the foregoing possible implementations of the second aspect, in a fifth possible implementation of the second aspect, the physical channel includes a physical downlink control channel (PDCCH) and/or a physical downlink shared channel (PDSCH).

According to a third aspect, a signal transmission apparatus is provided, and is configured to perform the method according to any one of the first aspect or the possible implementations of the first aspect. Specifically, the apparatus includes units configured to perform the method according to any one of the first aspect or the possible implementations of the first aspect.

According to a fourth aspect, a signal transmission apparatus is provided, and is configured to perform the method according to any one of the second aspect or the possible implementations of the second aspect. Specifically, the apparatus includes units configured to perform the method according to any one of the second aspect or the possible implementations of the second aspect.

According to a fifth aspect, a signal transmission apparatus is provided, and the apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method according to any one of the first aspect or the possible implementations of the first aspect.

According to a sixth aspect, a signal transmission apparatus is provided, and the apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method according to any one of the second aspect or the possible implementations of the second aspect.

According to a seventh aspect, a signal transmission system is provided, and the system includes the apparatus according to any one of the third aspect or the possible implementations of the third aspect and the apparatus according to any one of the fourth aspect or the possible implementations of the fourth aspect; or the system includes the apparatus according to any one of the fifth aspect or the possible implementations of the fifth aspect and the apparatus according to any one of the sixth aspect or the possible implementations of the sixth aspect.

According to an eighth aspect, a computer readable medium is provided, and is configured to store a computer program. The computer program includes an instruction used to perform the method according to any one of the first aspect or the possible implementations of the first aspect.

According to a ninth aspect, a computer readable medium is provided, and is configured to store a computer program. The computer program includes an instruction used to perform the method according to any one of the second aspect or the possible implementations of the second aspect.

DESCRIPTION OF EMBODIMENTS

The following describes the technical solutions in the embodiments of this application with reference to the accompanying drawings in the embodiments of this application.

It should be understood that, the technical solutions in the embodiments of this application may be applied to various communications systems, such as a Global System for Mobile Communications (GSM) system, a Code Division Multiple Access (CDMA) system, a Wideband Code Division Multiple Access (WCDMA) system, a General Packet Radio Service (GPRS) system, a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, and a future 5G communications system.

Figure 1:
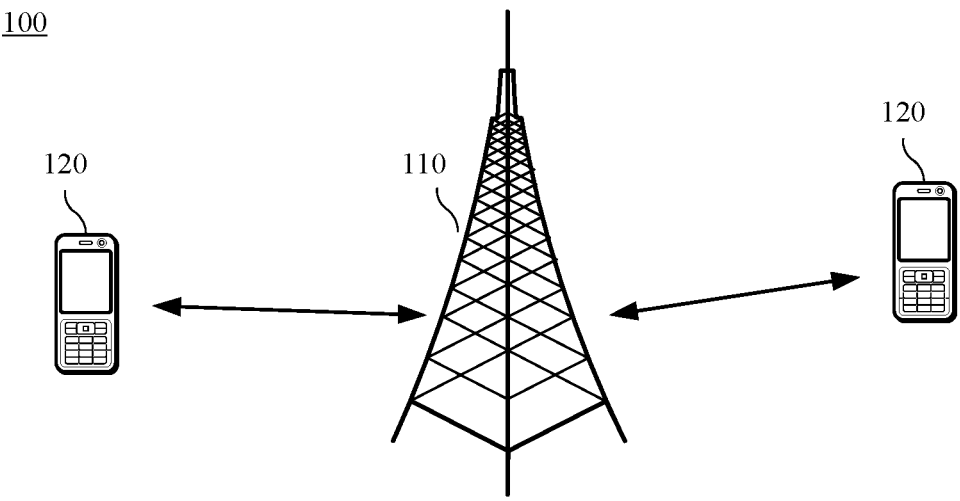
FIG. 1 is a schematic diagram of a communications system to which an embodiment of this application is applied.

FIG. 1 shows a communications system 100 to which an embodiment of this application is applied. The communications system 100 may include at least one network device 110. The network device 100 may be a device that communicates with a terminal device, for example, a base station or a base station controller. Each network device 100 may provide communication coverage for a particular geographical area, and may communicate with a terminal device (for example, UE) located in this coverage area (a cell). The network device 100 may be a base transceiver station (BTS) in a GSM system or a Code Division Multiple Access (CDMA) system, a NodeB (NB) in a WCDMA system, an evolved NodeB (eNB or eNodeB) in an LTE system, or a radio controller in a cloud radio access network (CRAN). Alternatively, the network device may be a relay node, an access point, an in-vehicle device, a wearable device, a network side device in a future 5G network, a network device in a future evolved public land mobile network (PLMN), or the like.

The wireless communications system 100 further includes a plurality of terminal devices 120 located in the coverage area of the network device 110. The terminal device 120 may be mobile or immobile. The terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN), or the like.

FIG. 1 shows one network device and two terminal devices as an example. Optionally, the communications system 100 may include a plurality of network devices, and another quantity of terminal devices may be included in a coverage area of each network device. This is not limited in this embodiment of this application.

Optionally, the wireless communications system 100 may further include another network entity, such as a network controller or a mobility management entity. This embodiment of this application is not limited thereto.

Figure 2:
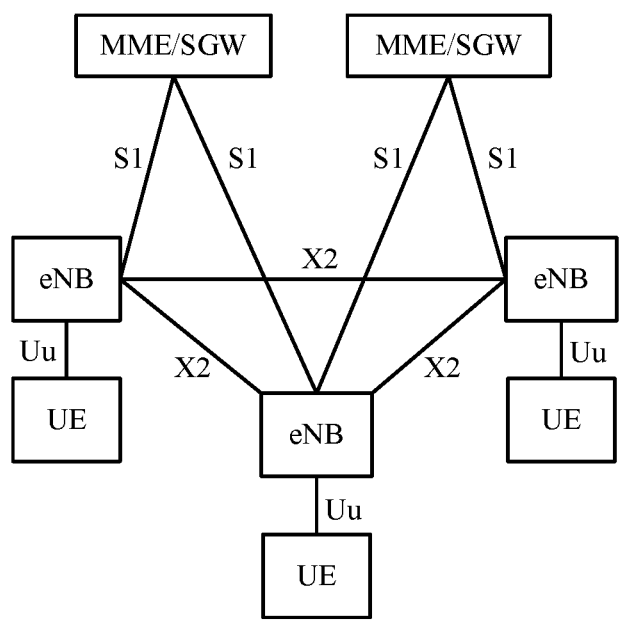
FIG. 2 is a schematic diagram of another communications system to which an embodiment of this application is applied.

FIG. 2 shows another communications system 200 to which an embodiment of this application is applied. The system 200 is of an LTE system architecture, and mainly includes a mobility management entity (MME)/serving gateway (SGW), a base station eNB, and user equipment UE. The following describes network elements and interfaces in the system 200 in detail.

MME/SGW: The MME is a key control node in 3rd Generation Partnership Project (3GPP) LTE, and is a core-network network element. The MME is mainly responsible for signaling processing, that is, a control-plane function, including functions such as access control, mobility management, attaching and detaching, session management, and gateway selection. The SGW is an important network element of a core network in 3GPP LTE, and is mainly responsible for a user-plane function of user data forwarding, that is, routing and forwarding a data packet under control of the MME.

eNB: The eNB is a base station in LTE, and is mainly responsible for functions such as radio resource management, quality of service (QoS) management, data compression, and data encryption that are performed on an air interface side. On a core network side, the eNB is mainly responsible for forwarding control-plane signaling to the MME and forwarding user-plane service data to the SGW.

UE: The UE is a device that accesses a network side by using the eNB in LTE, and may be, for example, a handheld terminal, a notebook computer, or another device that can access a network.

S1 interface: The S1 interface is a standard interface between the eNB and the core network, and includes an S1-MME interface and an S1-U interface. The eNB is connected to the MME through the S1-MME interface, to transmit control signaling. The eNB is connected to the SGW through the S1-U interface, to transmit user data.

X2 interface: The X2 interface is a standard interface between eNBs, and is configured to implement interworking between base stations.

Uu interface: The Uu interface is a wireless interface between the UE and the eNB. The UE is connected to the eNB through the Uu interface, so as to access an LTE network.

It should be understood that, when the terminal device in the system 100 is UE and the network device in the system 100 is an eNB, the system 100 may be included in the system 200. However, this is not limited in this embodiment of this application.

It should be further understood that being applied to an LTE system is used as an example for description in this embodiment of this application. However, this application is not limited thereto. In addition, terms "system" and "network" in this specification are usually used interchangeably in this specification.

To adapt to a rapid change in characteristics of uplink and downlink services in a small-coverage network, a dynamic time division duplex (D-TDD) technology has become one of key technologies of next generation mobile communications. D-TDD means that uplink/downlink switching is flexibly and rapidly performed for a subframe or slot in time division duplex (TDD) based on a load status of uplink and downlink services in a network, to meet a specific service requirement in the network and improve a throughput of the uplink and downlink services in the network. However, in D-TDD, co-channel cross interference exists between neighboring cells. This includes interference from downlink transmission of a co-channel base station serving a neighboring cell to uplink reception of a base station serving a cell; and interference from uplink transmission of UE in a neighboring cell to downlink reception of UE in a cell. To better achieve an advantage of flexible and efficient performance of the D-TDD technology and effectively improve a D-TDD performance gain, a series of measurement reference signals (MRS) usually need to be sent or received between base stations or user equipments. Interference/channel measurement performed between base stations has relatively small impact on an access link. Therefore, a non-standardized method may usually be designed for the interference/channel measurement, and the measurement does not need to be standardized. In view of this, according to the method in this embodiment of this application, a reference signal can be configured for interference/channel measurement between UEs.

Figure 3:
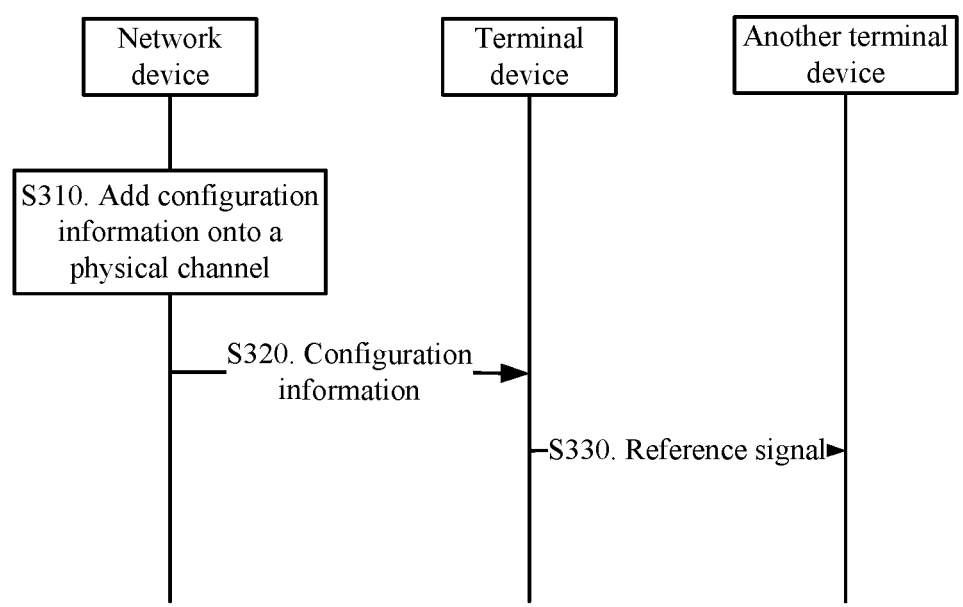
FIG. 3 is a schematic flowchart of a signal transmission method according to an embodiment of this application.

FIG. 3 is a schematic flowchart of a signal transmission method 300 according to an embodiment of this application. The method 300 may be applied to the system architecture 100 shown in FIG. 1, or may be applied to the system architecture 200 shown in FIG. 2.

However, this embodiment of this application is not limited thereto.

S310. A network device adds configuration information onto a physical channel, where the configuration information is used to instruct a terminal device to send a reference signal, and a resource used to transmit the reference signal is determined based on a public cell identity of a cell to which the terminal device belongs.

S320. The network device sends the configuration information to the terminal device through the physical channel.

S330. The terminal device receives the configuration information, and sends the reference signal based on the configuration information by using the resource.

Specifically, the network device may add the higher-layer-generated configuration information onto the physical channel, and then send the configuration information to the terminal device through the physical channel. The configuration information is used to instruct the terminal device to send the reference signal, and the resource used to transmit the reference signal is determined by the terminal device based on the public cell identity of the cell to which the terminal device belongs. After receiving the configuration information sent by the network device, the terminal device determines, based on the configuration information, the resource for sending the reference signal, and sends the reference signal by using the resource.

It should be understood that the sending, by the terminal device, the reference signal means that the terminal device sends the reference signal to another terminal device in a neighboring cell, and the reference signal is used to perform interference/channel measurement between the terminal devices.

Therefore, according to the signal transmission method in this embodiment of this application, the network device sends the configuration information to the terminal device, and after receiving the configuration information, the terminal device sends the reference signal based on the public cell identity of the cell to which the terminal device belongs. In this way, an existing reference signal can be used to perform interference/channel measurement between terminal devices, and a terminal device on a receiving side can distinguish between interference cells while reference signal utilization is improved.

In an optional embodiment, the resource used to transmit the reference signal includes at least one of the following: a symbol used to transmit the reference signal, a subcarrier used to transmit the reference signal, a cyclic shift of the reference signal, and an orthogonal cover code of the reference signal.

Specifically, the resource used to transmit the reference signal may include at least one of a time domain resource, a frequency domain resource, a code domain resource, and a space domain resource. The four types of resources are specifically the symbol used to transmit the reference signal, the subcarrier used to transmit the reference signal, the cyclic shift of the reference signal, and the orthogonal cover code of the reference signal. It should be understood that, in addition to the four types of resources, the resource used to transmit the reference signal may further include another resource. This is not limited in this embodiment of this application.

It should be understood that the symbol used to transmit the reference signal and the subcarrier used to transmit the reference signal are corresponding to a time-frequency resource, and may be specifically a resource element (RE) used to transmit the reference signal.

In an optional embodiment, the reference signal is a first-type reference signal and/or a second-type reference signal, the first-type reference signal is a sounding reference signal SRS or a first demodulation reference signal DMRS, and the second-type reference signal is a channel state information-reference signal CSI-RS or a second demodulation reference signal DMRS.

Specifically, the reference signal sent by the terminal device may be the first-type reference signal (that is, an uplink reference signal) or may be the second-type reference signal (that is, a downlink reference signal), and a resource element corresponding to the reference signal is used for physical layer transmission and does not carry information from a higher layer.

It should be understood that there are a plurality of reference signals used for uplink and downlink transmission between the network device and the terminal device. In an existing LTE standard, uplink reference signals include a demodulation reference signal (DMRS) used for uplink control/data channel demodulation, and a sounding reference signal (SRS) used for uplink channel measurement; and downlink reference signals include a cell-specific reference signal (CRS) used for downlink control/data demodulation/downlink channel measurement, a demodulation reference signal DMRS used for downlink control/data channel demodulation, and a channel state information-reference signal (CSI-RS) used for downlink channel measurement.

In an optional embodiment, the configuration information is further used to indicate whether the reference signal of the terminal device is used for interference/channel measurement between terminal devices, and when the configuration information indicates that the reference signal of the terminal device is used for interference/channel measurement between terminal devices, the first configuration information is further used to indicate whether the terminal device is a sender or a receiver.

It should be understood that, for a configuration result of the configuration information, there may be the following three cases:

(1) When the configuration information is used to indicate that the reference signal of the terminal device is used for interference/channel measurement between terminal devices, and indicate that the terminal device is a sender, the terminal device performs step S330.

(2) When the configuration information is used to indicate that the reference signal of the terminal device is used for interference/channel measurement between terminal devices, and indicate that the terminal device is a receiver, the terminal device receives the reference signal sent by another terminal device in a neighboring cell, performs interference/channel measurement between the terminal devices based on the reference signal, and feeds back measured channel state information to the network device to which the terminal device belongs.

(3) When the configuration information is used to indicate that the reference signal of the terminal device is not used for interference/channel measurement between terminal devices, in other words, when the configuration information is used to indicate that the reference signal of the terminal device is used for uplink or downlink measurement between the terminal device and the network device, the terminal device sends an uplink reference signal or receives a downlink reference signal based on the configuration information.

It should be understood that the reference signals configured in case (1) and case (2) are used for interference/channel measurement between terminal devices, and in the two cases, the reference signal sent or received by the terminal device may be an uplink reference signal in the existing standard, or may be a downlink reference signal in the existing standard. This is not limited in this embodiment of this application. However, in case (3), the reference signal configured by the network device is used for uplink or downlink measurement. If the terminal device is a sender, a reference signal sent by the terminal device is inevitably an uplink reference signal in the existing standard. If the terminal device is a receiver, a reference signal received by the terminal device is inevitably a downlink reference signal in the existing standard.

In an optional embodiment, the configuration information may be carried by higher layer signaling or physical layer signaling. The following describes this embodiment of this application in detail by using a base station and UE as an example.

In a possible implementation, the base station may use a CSI-RS for inter-UE measurement. In an existing LTE protocol, a base station/a transmit-receive point (TRP) configures a CSI-RS for UE by using higher layer signaling CSI-RS-Config-r10, and the configuration is at a UE level. In this embodiment of this application, the network device may add two fields, for example, an interUEMeas field and a Tx-Rx-Diff field, to the existing higher layer signaling CSI-RS-Config-r10. interUEMeas is used to indicate whether a CSI-RS is enabled for inter-UE measurement. An enabling method includes that the terminal device may determine, based on presence or absence of the interUEMeas field, whether a CSI-RS is enabled for inter-UE measurement, or the terminal device may determine, based on a value of the interUEMeas field, whether a CSI-RS is enabled for inter-UE measurement. Tx-Rx-Diff is used to indicate whether UE configured when inter-UE measurement is enabled is a sender or a receiver. The configured UE is a sender when a value of Tx-Rx-Diff is 0. The configured UE is a receiver when a value of Tx-Rx-Diff is 1.

In an implementation, in the foregoing enabling method, whether a CSI-RS is enabled for inter-UE measurement may be determined based on presence or absence of the interUEMeas field. Specifically, attributes of the interUEMeas field and the Tx-Rx-Diff field are both "optional (OPTIONAL)". To be specific, the network device may or may not configure the two fields in the higher layer signaling CSI-RS-Config-r10, as shown in the following:

```
-- ASN1START
CSI-RS-Config-r10 ::=    SEQUENCE {
    csi-RS-r10                CHOICE {
    interUEMeas               InterUEMeas                              OPTIONAL,
    Tx-Rx-Diff                INTEGER (0...1)                          OPTIONAL,
    release                   NULL,
    setup                     SEQUENCE {
    antennaPortsCount-r10     ENUMERATED {an1, an2, an4, an8},
    resourceConfig-r10            INTEGER (0..31),
    subframeConfig-r10            INTEGER (0..154),
    p-C-r10                       INTEGER (-8..15)
    }
    }                                       OPTIONAL,-- Need ON
    zeroTxPowerCSI-RS-r10     ZeroTxPowerCSI-RS-Conf-r12    OPTIONAL
-- Need ON
}
```

If detecting that there is the interUEMeas field in the higher layer signaling CSI-RS-Config-r10, the UE considers that the configured CSI-RS is used for inter-UE measurement, and determines, based on the value of Tx-Rx-Diff, whether to send or receive the CSI-RS, that is, whether the UE is a sender or a receiver. When the UE is a sender, the UE configures and sends the CSI-RS based on configuration information in the CSI-RS-Config-r10 or according to a predefined configuration method. When the UE is a receiver, the UE receives the CSI-RS based on configuration information in the CSI-RS-Config-r10 or according to a predefined configuration method, performs measurement, and feeds back channel state information and a location of a time-frequency resource occupied by the CSI-RS and/or an orthogonal sequence used for the CSI-RS. Otherwise, if the UE does not detect the interUEMeas field in the higher layer signaling CSI-RS-Config-r10, the UE considers that the configured CSI-RS signal is used for downlink measurement. For the CSI-RS, the UE is a receiver, and the UE may receive the CSI-RS based on configuration information in the CSI-RS-Config-r10, performs measurement, and feeds back channel state information.

In another implementation, in the foregoing enabling method, whether a CSI-RS is enabled for inter-UE measurement may be determined based on the value of the interUEMeas field. Specifically, different from that in the foregoing implementation, the interUEMeas field is indispensable; however, the attribute of the Tx-Rx-Diff field may still be "OPTIONAL", as shown in the following:

```
-- ASN1START
CSI-RS-Config-r10 ::=    SEQUENCE {
    csi-RS-r10                CHOICE {
    interUEMeas               INTEGER (0...1)
    Tx-Rx-Diff                INTEGER (0...1)                          OPTIONAL,
    release                   NULL,
    setup                     SEQUENCE {
    antennaPortsCount-r10     ENUMERATED {an1, an2, an4, an8},
    resourceConfig-r10            INTEGER (0..31),
    subframeConfig-r10            INTEGER (0..154),
    p-C-r10                       INTEGER (-8..15)
    }
    }                                       OPTIONAL,-- Need ON
    zeroTxPowerCSI-RS-r10     ZeroTxPowerCSI-RS-Conf-r12    OPTIONAL
-- Need ON
}
```

If detecting that the value of the interUEMeas field in the higher layer signaling CSI-RS-Config-r10 is 1, the UE considers that the configured CSI-RS signal is used for inter-UE measurement, and determines, based on the value of Tx-Rx-Diff, whether to send or receive the CSI-RS, that is, whether the UE is a sender or a receiver. When the UE is a sender, the UE configures and sends the CSI-RS based on configuration information in the CSI-RS-Config-r10 or according to a predefined configuration method. When the UE is a receiver, the UE receives the CSI-RS based on configuration information in the CSI-RS-Config-r10 or according to a predefined configuration method, performs measurement, and feeds back channel state information and a location of a time-frequency resource occupied by the CSI-RS and/or an orthogonal sequence used for the CSI-RS. Otherwise, if the UE detects that the value of the interUEMeas field in the higher layer signaling CSI-RS-Config-r10 is 0, the UE considers that the configured CSI-RS signal is used for downlink measurement. For the CSI-RS, the UE is a receiver, and the UE may receive the CSI-RS based on configuration information in the CSI-RS-Config-r10, performs measurement, and feeds back channel state information.

It should be understood that, in the foregoing two implementations, if the UE does not detect the interUEMeas field or detects that the value of the interUEMeas field is 0, the UE may directly consider that the configured CSI-RS is used for downlink measurement. In this case, the UE may ignore presence or absence of the Tx-Rx-Diff field or the value of the Tx-Rx-Diff field.

It should be further understood that the foregoing two implementations are merely two optional embodiments, and in this embodiment of this application, the network device may alternatively implement the foregoing enabling method by using another field. This is not limited in this embodiment of this application. In addition, alternatively, the value of the interUEMeas field and the value of the Tx-Rx-Diff field may be two or more bits. This is not limited in this embodiment of this application either.

It should be further noted that the foregoing newly added fields are also applicable to modification of existing physical layer signaling, and a specific implementation process thereof is similar to that of the foregoing higher layer signaling. Details are not described herein again.

In another optional implementation, the base station may use an uplink DMRS for inter-UE measurement. In an existing LTE protocol, a base station/a transmit-receive point (TRP) configures an uplink DMRS for UE by using downlink control information (DCI), and the configuration is at a UE level. For example, a DCI format 0 includes:

Cyclic shift for DMRS and OCC index—3 bits as defined in section 5.5.2.1.1 of [2]

In the existing LTE standard, configuration of a DMRS is bound with a data channel, in other words, a network side configures an uplink DMRS only when UE needs to send uplink data. Therefore, in this embodiment of this application, UE-specific DCI that is newly designed is used to configure an uplink DMRS for inter-UE measurement. In the foregoing enabling method, whether the newly designed DCI indicates that inter-UE measurement is performed by using the uplink DMRS may be determined based on presence or absence of a Carrier indicator field. Specifically, the Carrier indicator field and a Flag for Tx/Rx differentiation field may be added to the DCI. An attribute of the Carrier indicator field is "optional (OPTIONAL)", and the Carrier indicator field may be zero bits, or may be three bits. If the Flag for Tx/Rx differentiation field is 0, it indicates that the uplink DMRS is to be sent. If the Flag for Tx/Rx differentiation field is 1, it indicates that the uplink DMRS is to be received. Therefore, a newly designed DCI format is as follows:

Carrier indicator—0 or 3 bits. The field is present according to the definitions in [3].
Flag for Tx/Rx differentiation—1 bit, where value 0 indicates Tx and value 1 indicates Rx
Cyclic shift for DMRS and OCC index—3 bits as defined in section 5.5.2.1.1 of [2] or
Carrier indicator—0 or 3 bits. The field is present according to the definitions in [3]
Flag for Tx/Rx differentiation—1 bit, where value 0 indicates Tx and value 1 indicates Rx If receiving DCI sent by the base station and detecting the Carrier indicator field in the DCI, the UE considers that the configured uplink DMRS is used for inter-UE measurement, and determines, based on the value of Flag for Tx/Rx differentiation, whether to send or receive the DMRS, that is, whether the UE is a sender or a receiver. When the UE is a sender, the UE configures and sends the uplink DMRS based on configuration information in the DCI or according to a predefined configuration method. When the UE is a receiver, the UE receives the uplink DMRS based on configuration information in the DCI or according to a predefined configuration method, performs measurement, and feeds back channel state information and a location of a time-frequency resource occupied by the uplink DMRS and/or an orthogonal sequence used for the uplink DMRS. Otherwise, if the UE does not detect the Carrier indicator field in the DCI, the UE considers that the configured uplink DMRS is used for uplink measurement. For the uplink DMRS, the UE is a sender, and the UE may send the uplink DMRS based on configuration information in the CSI-RS-Config-r10.

It should be understood that, in the foregoing two implementations, if the UE does not detect the Carrier indicator field, the UE may directly consider that the configured uplink DMRS is used for uplink measurement. In this case, the UE may ignore presence or absence of the Flag for Tx/Rx differentiation field or the value of the Flag for Tx/Rx differentiation field.

It should be further understood that the foregoing implementations are merely optional embodiments, and in this embodiment of this application, the network device may alternatively implement the foregoing enabling method by using another field. This is not limited in this embodiment of this application. In addition, alternatively, the value of the Carrier indicator field and the value of the Flag for Tx/Rx differentiation field may be at least two bits. This is not limited in this embodiment of this application either.

It should be further noted that the foregoing newly added fields are also applicable to existing higher layer signaling similar to the DCI, so that a same configuration effect is achieved. A specific implementation process thereof is similar to that of the foregoing physical layer signaling. Details are not described herein again.

In an optional embodiment, a cyclic prefix CP of the reference signal is a normal CP.

Specifically, using LTE as an example, a normal CP is a CP whose length is about 6.67% of a symbol length. The following specifically analyzes a reason for using the normal CP. It may be assumed that the reference signal used to perform inter-UE measurement is located between a downlink control channel and a data channel in time domain.

Figure 4:
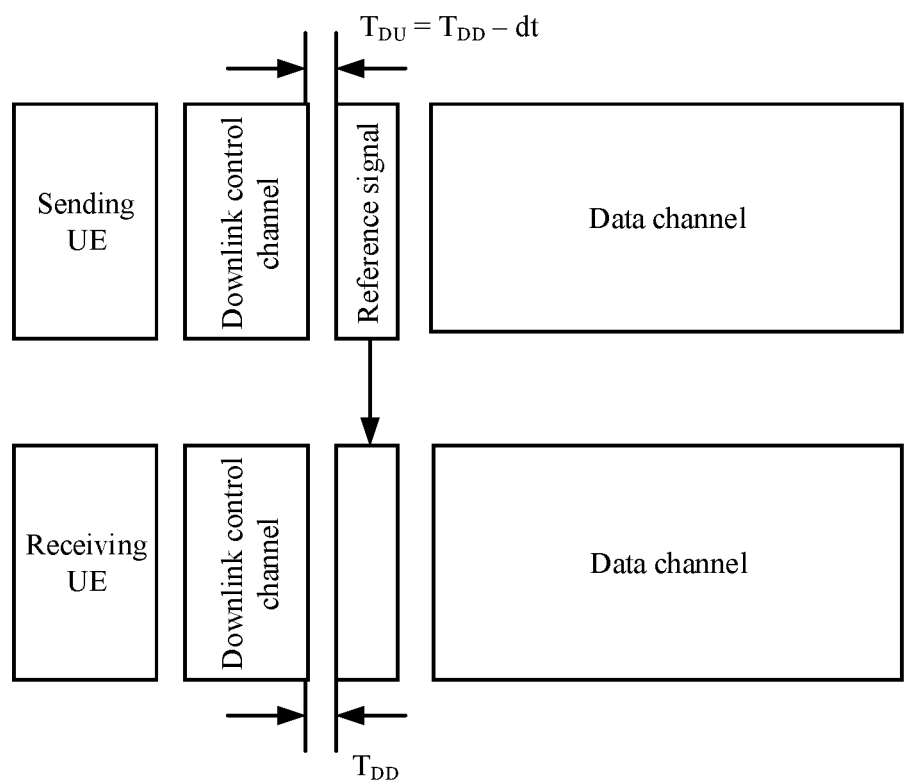
FIG. 4 is a schematic flowchart of another signal transmission method according to an embodiment of this application.

As shown in FIG. 4, after receiving UE completes reception on a downlink control channel, a guard interval TDD needs to be reserved. There are a plurality of cells in a network, and therefore the receiving UE not only receives downlink control information sent from a base station/TRP of a cell, but also receives downlink control information sent from a base station/TRP of another cell in the network. However, the base stations/TRPs of the cells are at different distances from the receiving UE; therefore, transmission delays for downlink control information from the base stations/TRPs of the cells to arrive at the receiving UE are different. If the receiving UE receives a reference signal immediately after the receiving UE completes receiving downlink control information from the base station/TRP of the cell, the reference signal is consequently interfered with by downlink control information sent by the base station/TRP of the another cell. Therefore, the guard interval TDD is used to ensure that, during receiving of the reference signal, the receiving UE is not interfered with by the downlink control information sent from the base station/TRP of the another cell in the network. A size of the guard interval TDD depends on a distance between a farthest base station/TRP in the network and the receiving UE. After sending UE completes sending on a downlink control channel, a guard interval TDU also needs to be reserved. A size of the guard interval TDU not only depends on a warm-up stabilization time of a power amplifier of the sending UE, but also depends on a transmission delay dt of transmitting the reference signal from the sending UE to the receiving UE. To sum up, values of TDD and TDU depend on the distance between the farthest base station/TRP in the network and the receiving UE, the warm-up stabilization time of the power amplifier of the UE, and the transmission delay dt of transmitting the reference signal from the sending UE to the receiving UE.

However, calculation of the transmission delay dt of transmitting the reference signal from the sending UE to the receiving UE is relatively complex, and it is usually difficult to obtain the transmission delay dt in a timely manner.

Usually, a distance between the sending UE and the receiving UE is relatively short. Therefore, a cyclic prefix (cyclic prefix, CP) may be used to resist the transmission delay. A reason is that filling a CP in a guard interval of orthogonal frequency division multiplexing (OFDM) symbols can ensure that a quantity of waveform cycles included in a delay replica of an OFDM symbol in a fast Fourier transformation (FFT) cycle is also an integer. In this way, a signal whose delay is less than the guard interval does not generate inter-symbol interference during demodulation, so that correctness of demodulation is ensured.

The existing LTE protocol stipulates three CP lengths corresponding to a 15 KHz subcarrier spacing, namely, a 4.687 μs normal CP, a 16.67 μs extended CP, and a 33.33 μs ultra extended CP. When a 60 KHz subcarrier spacing is used for the reference signal, a length of a normal CP is 1.172 μs, and it can be ensured that a transmission delay for a maximum of about 350 m falls within a range of the CP. When a 120 KHz subcarrier spacing is used for the reference signal, a length of a normal CP is 0.586 μs, and it can be ensured that a transmission delay for a maximum of about 180 m falls within a range of the CP. In practice, intensity of interference between UEs that are in neighboring cells and that are at a distance of 180 m or 350 m from each other may be ignored. Therefore, to reduce measurement overheads and ensure that more guard intervals are reserved, a normal CP is used as the CP of the reference signal according to a predefinition.

In an optional embodiment, the configuration information is carried by dynamic signaling or higher layer signaling.

It should be understood that the dynamic signaling may be carried on a physical downlink control channel (PDCCH), and the higher layer signaling may be a system message (master information block (SIB)) or may be radio resource control (RRC) signaling. This is not limited in this embodiment of this application.

In an optional embodiment, the sending, by the terminal device, the reference signal based on the configuration information by using the resource includes:

after receiving the configuration information, determining, by the terminal device, the resource based on the public cell identity of the cell to which the terminal device belongs; and sending, by the terminal device, the reference signal by using the resource.

Specifically, the terminal device receives the configuration information sent by the network device, and determines, based on the configuration information, that the reference signal is used for interference/channel measurement between terminal devices. When the terminal device is a sender, the terminal device may determine, based on the public cell identity, the resource used to send the reference signal, and send the reference signal by using the resource.

Optionally, the public cell identity of the cell to which the terminal device belongs may be a physical cell identity (PCI) of the cell to which the terminal device belongs, or may be another configuration-based identity. This is not limited in this embodiment of this application.

That the terminal device determines the public cell identity of the cell to which the terminal device belongs may specifically include two cases: If the public cell identity is the PCI, the PCI may be determined by the terminal device based on a synchronization signal during cell synchronization. If the public cell identity is the another configuration-based identity, the identity may be configured by the network device for the terminal device by using broadcast signaling or higher layer signaling. It should be understood that the public cell identity may be alternatively determined based on a result of negotiation between network devices, and the result is delivered to a terminal device in each cell by using physical layer signaling or higher layer signaling.

It should be further understood that, when two cells are geographically close to each other and reference signals from the two cells are quasi-co-located (QCL), the two cells may use a same public cell identity. However, this is not limited in this embodiment of this application. Herein, that the reference signals are QCL indicates that the reference signals have similar large-scale fading characteristics such as Doppler shifts, Doppler spreads, average delays, and/or time-domain spreads.

In an optional embodiment, the determining, by the terminal device, the resource based on the public cell identity of the cell to which the terminal device belongs includes:

calculating, by the terminal device, a resource index of the resource according to a predefined criterion based on the public cell identity of the cell to which the terminal device belongs; and determining, by the terminal device, the resource based on the resource index of the resource.

Specifically, the terminal device may calculate, according to the predefined criterion based on the public cell identity of the cell to which the terminal device belongs, the resource index of the resource used to send the reference signal, and then determine the resource based on the resource index. It should be understood that a resource index is a unique identifier used to determine a resource. Usually, resources are numbered, and a number corresponding to each resource is an index of the resource. The network device and/or the terminal device may determine, based on a resource index, a resource corresponding to the resource index. A correspondence between a resource index and a resource may be pre-stipulated in a protocol.

Figure 5:
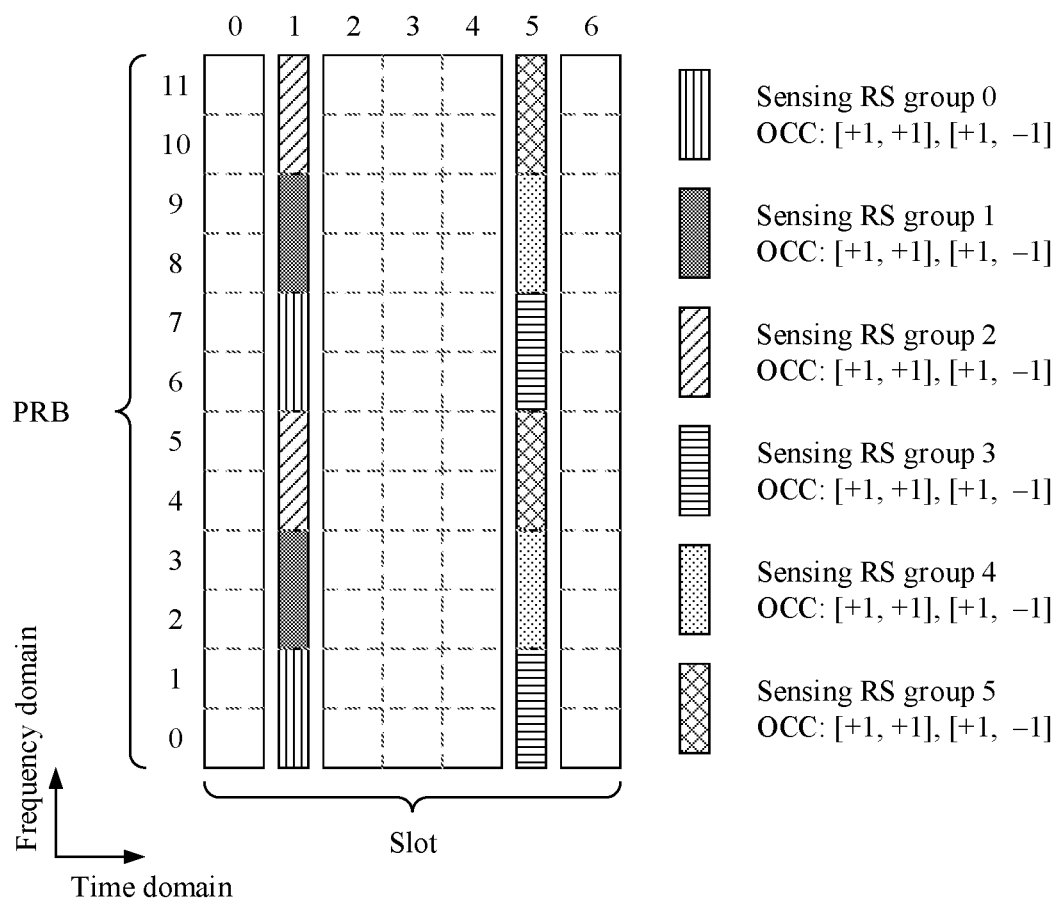
FIG. 5 is a schematic diagram of OFDM-based signal transmission according to an embodiment of this application.

In a possible implementation, configuration of a reference signal based on OFDM modulation is used as an example. As shown in FIG. 5, a horizontal axis is time domain, and a vertical axis is frequency domain. It is assumed that a subcarrier spacing used for a reference signal is twice a subcarrier spacing used for a control/data channel. A reference signal of each terminal device in a given cell is inserted into a second or a sixth OFDM symbol (that is, a symbol 1 or a symbol 5 in FIG. 5) of each slot slot, and two neighboring reference signals in a same OFDM symbol are spaced by three subcarriers in frequency domain. The terminal device may determine a resource used to transmit a reference signal, by using one or more of the following methods.

(1) Determine a symbol index of the reference signal based on a PCI of a cell to which the terminal device belongs, to be specific, determine whether the reference signal is located in the second OFDM symbol or the sixth OFDM symbol, where a value of the symbol index is 4(PCI mod 2)+1.

(2) Determine a frequency index (that is, a subcarrier index) of the reference signal based on a PCI of a cell to which the terminal device belongs, to be specific, determine a frequency-domain start location of the reference signal in each slot slot, where a value of the frequency index is PCI mod 3, the frequency index relates to a particular frequency shift of the cell, and as shown in FIG. 5, the frequency shift is 3.

(3) Determine an orthogonal cover code (OCC) index of the reference signal based on a PCI of a cell to which the terminal device belongs, where specifically, orthogonal cover code indexes of reference signals that are located on a same time-frequency resource and that are from terminal devices in different cells are PCI mod 2.

Therefore, different PCIs are allocated to different cells, so that different cells have different time domain resources, different frequency domain resources, or different code domain resources. When resources used for a reference signal include all of a time domain resource, a frequency domain resource, and a code domain resource, and all of the three foregoing methods are used, a resource conflict between reference signals from a maximum of 12 neighboring cells can be avoided, in other words, a terminal device that acts as a receiver can distinguish between reference signals from a maximum of 12 neighboring cells.

Figure 6:
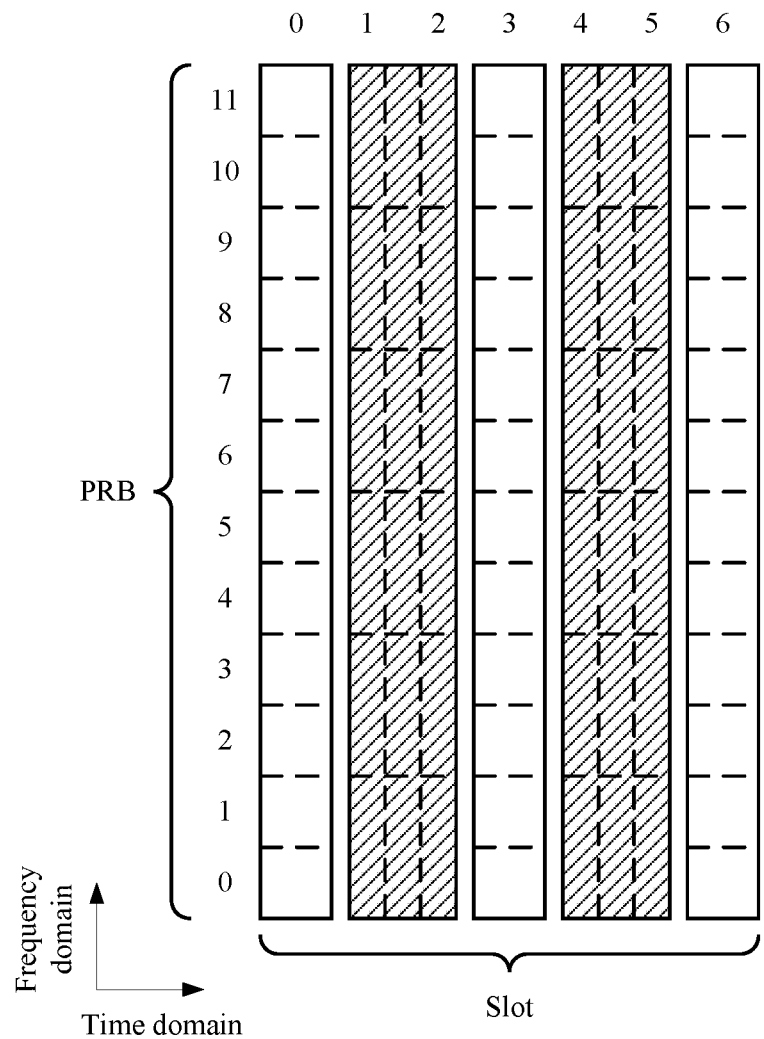
FIG. 6 is a schematic diagram of DFT-S-OFDM-based signal transmission according to an embodiment of this application.
Figure 7:
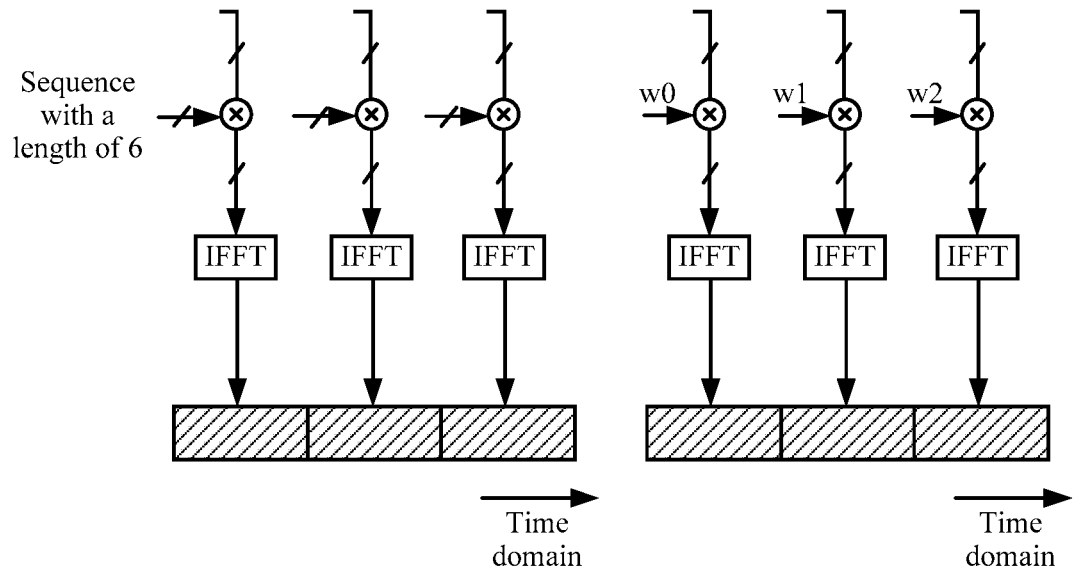
FIG. 7 is a schematic diagram of DFT-S-OFDM-based signal transmission according to an embodiment of this application.
Figure 8:
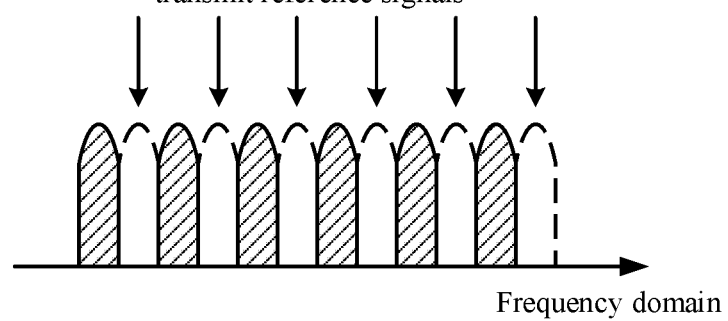
FIG. 8 is a schematic diagram of DFT-S-OFDM-based signal transmission according to an embodiment of this application.

In another possible implementation, configuration of a reference signal based on discrete Fourier transform spread spectrum orthogonal frequency division multiplexing (DFT-S-OFDM) modulation is used as an example. As shown in FIG. 6 to FIG. 8, it is assumed that a subcarrier spacing used for a reference signal is twice a subcarrier spacing used for a control/data channel. In FIG. 6, a horizontal axis is time domain, and a vertical axis is frequency domain. A reference signal of each terminal device in a given cell is inserted into second and third DFT-S-OFDM symbols or fifth and sixth DFT-S-OFDM symbols (that is, symbols 1 and 2 or symbols 4 and 5 in FIG. 6) of each slot slot. To ensure a single-carrier characteristic of the DFT-S-OFDM symbols, the reference signal may be a sequence with a length of 6, mapped to an entire DFT-S-OFDM symbol, and repeated on three consecutive/inconsecutive symbols, as shown in FIG. 7. Optionally, comb teeth may be further determined for a reference signal sent by a terminal device. As shown in FIG. 8, one terminal device may send one reference signal every other subcarrier. In this way, subcarriers in dashed-line parts are not used by the terminal device to transmit reference signals but may be used by another terminal device to transmit reference signals, so that a receiving side distinguishes between different terminal devices. However, this is not limited in this embodiment of this application.

In this embodiment of this application, frequency-domain orthogonality of a reference signal sent based on an OFDM modulation scheme may be converted to time-domain orthogonality of a reference signal sent based on a DFT-S-OFDM modulation scheme. Specifically, the terminal device may determine a resource used to transmit a reference signal, by using one or more of the following methods.

(1) Determine a symbol index of the reference signal based on a PCI of a cell to which the terminal device belongs, to be specific, determine whether the reference signal is located in the second and the third DFT-S-OFDM symbols or the fifth and the sixth DFT-S-OFDM symbols, where a value of the symbol index is 4(PCI mod 2)+j, j=1, 2.

(2) For reference signals that are located on a same time-frequency resource and that are from terminal devices in different cells, the configuration method includes one or more of the following:

1. Determine a cyclic shift index of the reference signal based on a PCI of a cell to which the terminal device belongs, where a value of the cyclic shift index is PCI mod 2;

2. Determine an OCC index of the reference signal based on a PCI of a cell to which the terminal device belongs, where a value of the OCC index is PCI mod 3;

3. Determine a "comb teeth" index of the reference signal based on a PCI of a cell to which the terminal device belongs, where a value of the "comb teeth" index is [PCI/2] mod 2.

Therefore, different PCIs are allocated to different cells, so that different cells have different time domain resources, different frequency domain resources, or different code domain resources. When resources used for a reference signal include all of a time domain resource, a frequency domain resource, and a code domain resource, and all of the three foregoing methods are used, a resource conflict between reference signals from a maximum of 24 neighboring cells can be avoided, in other words, a terminal device that acts as a receiver can distinguish between reference signals from a maximum of 24 neighboring cells.

In the existing LTE protocol, all uplink reference signals sent by a terminal device are specific to the terminal device. To be specific, one or more of a time-frequency resource used for the reference signal, a sequence of the reference signal, an orthogonal cover code of the reference signal, and a cyclic shift of the reference signal is/are calculated by using a terminal device identity. However, a level of interference between terminal devices in neighboring cells varies with a slot slot, and variation of the level of interference is further caused by variation of a distance between the terminal devices in the neighboring cells due to mobility of the terminal devices. It is difficult for a terminal device in a cell to learn of an identity of a terminal device in a neighboring cell. In addition, a quantity of terminal devices in the neighboring cell is large and changes rapidly. Therefore, even if the terminal device in the cell performs blind detection on identities of all possible terminal devices, the detection is extremely complex.

Therefore, in a scenario in which semi-static measurement reporting between terminal devices is supported, an orthogonal reference signal at a terminal device level is not suitable for use. Actually, a reported measurement quantity in semi-static measurement reporting between terminal devices should be at an average interference level of terminal devices in neighboring cells on a corresponding time-frequency resource. In this case, a cell-level orthogonal reference signal may be used. To be specific, all terminal devices in a given cell send a same measurement reference signal on a same time-frequency resource, and time-frequency resources and/or measurement reference signals used by terminal devices in different cells are orthogonal/quasi-orthogonal.

To sum up, in this embodiment of this application, a terminal device on a sending side uses a public cell identity to determine a resource used for a reference signal, and reference signals between cells are orthogonal. In this way, a terminal device on a receiving side can distinguish, through simple operation, between reference signals for which a same time-frequency resource is used and that are from different cells, so that measurement efficiency is improved.

In an optional embodiment, the resource used to transmit the reference signal is determined by the terminal device from at least one candidate resource based on the public cell identity of the cell to which the terminal device belongs and a first mapping relationship, the first mapping relationship is used to indicate a correspondence between at least one public cell identity and the at least one candidate resource, and the at least one public cell identity includes the public cell identity of the cell to which the terminal device belongs.

Specifically, the resource used to transmit the reference signal may be independently determined, or may be predefined in a protocol. In this embodiment of this application, feasible resource combinations, such as a combination of a subcarrier, a symbol, and an OCC, and a combination of a subcarrier and a symbol, may be predefined in the protocol, and a number is predefined for each combination.

In an optional embodiment, the sending, by the terminal device, the reference signal based on the configuration information by using the resource includes: sending, by the terminal device, the reference signal to at least one other terminal device based on the configuration information by using the resource.

It should be understood that the sequence numbers of the foregoing processes do not indicate an execution sequence. An execution sequence of the processes should be determined based on functions and internal logic of the processes, but should not constitute any limitation on an implementation process of this embodiment of this application.

The foregoing describes in detail the signal transmission methods according to the embodiments of this application with reference to FIG. 1 to FIG. 8. The following describes in detail signal transmission apparatuses according to the embodiments of this application with reference to FIG. 9 to FIG. 12.

Figure 9:
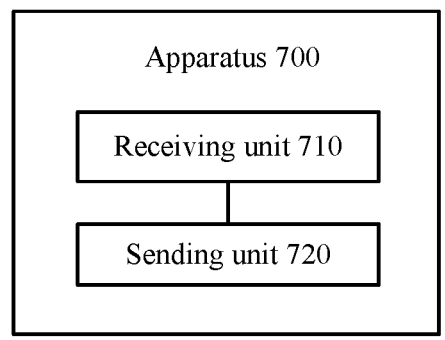
FIG. 9 is a schematic block diagram of a signal transmission apparatus according to an embodiment of this application.

FIG. 9 shows a signal transmission apparatus 700 according to an embodiment of this application. The apparatus 700 includes:

a receiving unit, configured to receive configuration information sent by a network device, where the configuration information is used to instruct the apparatus to send a reference signal, and a resource used to transmit the reference signal is determined based on a public cell identity of a cell to which the apparatus belongs; and a sending unit, configured to send the reference signal based on the configuration information by using the resource.

According to the signal transmission apparatus in this embodiment of this application, the network device sends the configuration information to the terminal device, and after receiving the configuration information, the terminal device sends the reference signal based on the public cell identity of the cell to which the terminal device belongs. In this way, an existing reference signal can be used to perform interference/channel measurement between terminal devices, and a terminal device on a receiving side can distinguish between interference cells while reference signal utilization is improved.

Optionally, the resource used to transmit the reference signal includes at least one of the following: a symbol used to transmit the reference signal, a subcarrier used to transmit the reference signal, a cyclic shift of the reference signal, and an orthogonal cover code of the reference signal.

Optionally, the reference signal is a first-type reference signal and/or a second-type reference signal, the first-type reference signal is a sounding reference signal SRS or a first demodulation reference signal DMRS, and the second-type reference signal is a channel state information-reference signal CSI-RS or a second demodulation reference signal DMRS.

Optionally, a cyclic prefix CP of the reference signal is a normal CP.

Optionally, the configuration information is carried by dynamic signaling or higher layer signaling.

Optionally, the apparatus further includes a determining unit, configured to determine, after the configuration information is received, the resource based on the public cell identity of the cell to which the apparatus belongs; and the sending unit is specifically configured to send the reference signal by using the resource.

Optionally, the determining unit is specifically configured to: calculate a resource index of the resource according to a predefined criterion based on the public cell identity of the cell to which the apparatus belongs; and determine the resource based on the resource index of the resource.

Optionally, the resource used to transmit the reference signal is determined from at least one candidate resource based on the public cell identity of the cell to which the terminal device belongs and a first mapping relationship, the first mapping relationship is used to indicate a correspondence between at least one public cell identity and the at least one candidate resource, and the at least one public cell identity includes the public cell identity of the cell to which the apparatus belongs.

Optionally, the sending unit is specifically configured to send the reference signal to at least one other terminal device based on the configuration information by using the resource.

It should be understood that the apparatus 700 is presented in a form of a functional unit. The term "unit" herein may refer to an application-specific integrated circuit (ASIC), an electronic circuit, a processor configured to execute one or more software or firmware programs (for example, a shared processor, a dedicated processor, or a group processor), a memory, a combined logic circuit, and/or another proper component that supports the described functions. In an optional example, a person skilled in the art may understand that the apparatus 700 may be specifically the terminal device in the foregoing embodiments, and the apparatus 700 may be configured to perform procedures and/or steps corresponding to the terminal device in the foregoing method embodiments. To avoid repetition, details are not described herein again.

Figure 10:
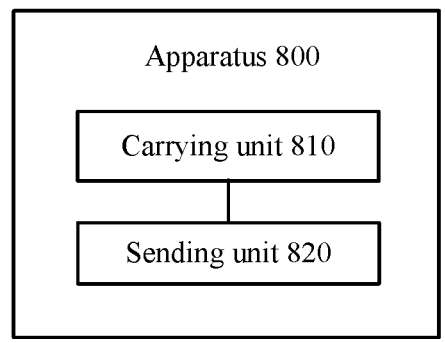
FIG. 10 is a schematic block diagram of another signal transmission apparatus according to an embodiment of this application.

FIG. 10 shows a signal transmission apparatus 800 according to an embodiment of this application. The apparatus 800 includes:

a carrying unit, configured to add configuration information onto a physical channel, where the configuration information is used to instruct a terminal device to send a reference signal, and a resource used to transmit the reference signal is determined based on a public cell identity of a cell to which the terminal device belongs; and a sending unit, configured to send the configuration information to the terminal device through the physical channel.

According to the signal transmission apparatus in this embodiment of this application, the network device sends the configuration information to the terminal device, and after receiving the configuration information, the terminal device sends the reference signal based on the public cell identity of the cell to which the terminal device belongs. In this way, an existing reference signal can be used to perform interference/channel measurement between terminal devices, and a terminal device on a receiving side can distinguish between interference cells while reference signal utilization is improved.

Optionally, the resource used to transmit the reference signal includes at least one of the following: a symbol used to transmit the reference signal, a subcarrier used to transmit the reference signal, a cyclic shift of the reference signal, and an orthogonal cover code of the reference signal.

Optionally, the reference signal is a first-type reference signal and/or a second-type reference signal, the first-type reference signal is a sounding reference signal SRS or a first demodulation reference signal DMRS, and the second-type reference signal is a channel state information-reference signal CSI-RS or a second demodulation reference signal DMRS.

Optionally, a cyclic prefix CP of the reference signal is a normal CP.

Optionally, the configuration information is carried by dynamic signaling or higher layer signaling.

Optionally, the physical channel includes a physical downlink control channel PDCCH and/or a physical downlink shared channel PDSCH.

It should be understood that the apparatus 800 is presented in a form of a functional unit. The term "unit" herein may refer to an application-specific integrated circuit (ASIC), an electronic circuit, a processor configured to execute one or more software or firmware programs (for example, a shared processor, a dedicated processor, or a group processor), a memory, a combined logic circuit, and/or another proper component that supports the described functions. In an optional example, a person skilled in the art may understand that the apparatus 800 may be specifically the network device in the foregoing embodiments, and the apparatus 800 may be configured to perform procedures and/or steps corresponding to the network device in the foregoing method embodiments. To avoid repetition, details are not described herein again.

Figure 11:
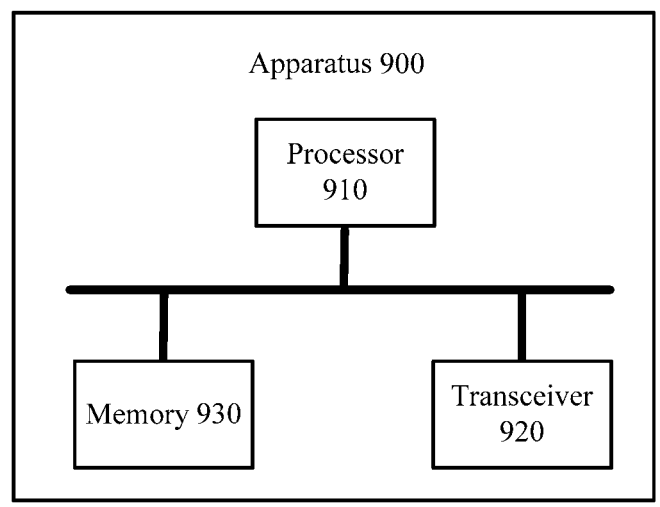
FIG. 11 is a schematic block diagram of another signal transmission apparatus according to an embodiment of this application.

FIG. 11 shows another signal transmission apparatus 900 according to an embodiment of this application. The apparatus 900 includes a processor 910, a transceiver 920, and a memory 930. The processor 910, the transceiver 920, and the memory 930 communicate with each other by using an internal connection path. The memory 930 is configured to store an instruction. The processor 910 is configured to execute the instruction stored in the memory 930, to control the transceiver 920 to send a signal and/or receive a signal.

The transceiver 920 is configured to: receive configuration information sent by a network device, where the configuration information is used to instruct the apparatus to send a reference signal, and a resource used to transmit the reference signal is determined based on a public cell identity of a cell to which the apparatus belongs; and send the reference signal based on the configuration information by using the resource.

It should be understood that the apparatus 900 may be specifically the terminal device in the foregoing embodiments, and may be configured to perform steps and/or procedures corresponding to the terminal device in the foregoing method embodiments. Optionally, the memory 930 may include a read-only memory and a random access memory, and provide an instruction and data to the processor. A part of the memory may further include a non-volatile random access memory. For example, the memory may further store device type information. The processor 910 may be configured to execute the instruction stored in the memory. When the processor 910 executes the instruction stored in the memory, the processor 910 is configured to perform the steps and/or the procedures in the foregoing method embodiments corresponding to the terminal device.

Figure 12:
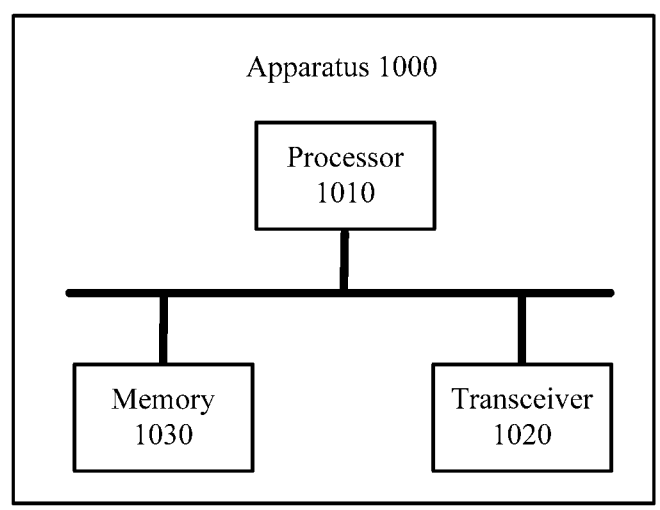
FIG. 12 is a schematic block diagram of another signal transmission apparatus according to an embodiment of this application.

FIG. 12 shows another signal transmission apparatus 1000 according to an embodiment of this application. The apparatus 1000 includes a processor 1010, a transceiver 1020, and a memory 1030. The processor 1010, the transceiver 1020, and the memory 1030 communicate with each other by using an internal connection path. The memory 1030 is configured to store an instruction. The processor 1010 is configured to execute the instruction stored in the memory 1030, to control the transceiver 1020 to send a signal and/or receive a signal.

The processor 1010 is configured to add configuration information onto a physical channel, where the configuration information is used to instruct a terminal device to send a reference signal, and a resource used to transmit the reference signal is determined based on a public cell identity of a cell to which the terminal device belongs; and the transceiver 1020 is configured to send the configuration information to the terminal device through the physical channel.

It should be understood that the apparatus 1000 may be specifically the network device in the foregoing embodiments, and may be configured to perform steps and/or procedures corresponding to the network device in the foregoing method embodiments. Optionally, the memory 1030 may include a read-only memory and a random access memory, and provide an instruction and data to the processor. A part of the memory may further include a non-volatile random access memory. For example, the memory may further store device type information. The processor 1010 may be configured to execute the instruction stored in the memory. When the processor 1010 executes the instruction stored in the memory, the processor 1010 is configured to perform the steps and/or the procedures in the foregoing method embodiments corresponding to the network device.

It should be understood that in the embodiments of this application, the processor in the foregoing apparatus may be a central processing unit (CPU), or the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

In an implementation process, the steps of the foregoing method may be implemented by using a hardware integrated logic circuit in the processor, or by using an instruction in a form of software. The steps of the method disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor reads the instruction in the memory and completes the steps of the foregoing method in combination with the hardware of the processor. To avoid repetition, details are not described herein again.

A person of ordinary skill in the art may be aware that the method steps and units described with reference to the embodiments disclosed in this specification can be implemented by electronic hardware, computer software, or a combination thereof. To clearly describe interchangeability between the hardware and the software, the foregoing has generally described the steps and compositions of the embodiments based on functions.

Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for a purpose of ease and brevity of description, for detailed working processes of the described system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not be performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected depending on actual requirements, to achieve the objectives of the solutions in the embodiments of this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A signal transmission method, comprising:
   receiving, by a terminal device, configuration information sent by a network device, wherein the configuration information is configured to instruct the terminal device to send a reference signal, and a resource for transmitting the reference signal is determined based on a public cell identity of a cell to which the terminal device belongs; and
   sending, by the terminal device, the reference signal based on the configuration information by using the resource to at least one other terminal device in a neighboring cell,
   wherein the configuration information is further configured to indicate whether the reference signal is used for interference/channel measurement between terminal devices, and when the configuration information indicates that the reference signal is used for interference/channel measurement between terminal devices, the configuration information is further configured to indicate whether the terminal device is a sender or a receiver,
   wherein the sending, by the terminal device, the reference signal based on the configuration information by using the resource comprises:
   upon determining that the configuration information indicates that the reference signal is used for interference/channel measurement between terminal devices and the configuration information indicates that the terminal device is a sender, determining, by the terminal device, the resource based on the public cell identity (PCI) of the cell to which the terminal device belongs, and
   sending, by the terminal device, the reference signal by using the resource.

2. The method according to claim 1, wherein the resource used to transmit the reference signal comprises at least one of:
   a symbol used to transmit the reference signal, a subcarrier used to transmit the reference signal, a cyclic shift of the reference signal, or an orthogonal cover code of the reference signal.

3. The method according to claim 1, wherein the reference signal is a first-type reference signal and/or a second-type reference signal, the first-type reference signal is a sounding reference signal (SRS) or a first demodulation reference signal (DMRS), and the second-type reference signal is a channel state information-reference signal (CSI-RS) or a second demodulation reference signal (DMRS).

4. The method according to claim 1, wherein the resource is determined by the terminal device from at least one candidate resource based on the public cell identity of the cell to which the terminal device belongs and a first mapping relationship, the first mapping relationship is used to indicate a correspondence between at least one public cell identity and the at least one candidate resource, and the at least one public cell identity comprises the public cell identity of the cell to which the terminal device belongs.

5. The method according to claim 1, wherein the sending, by the terminal device, the reference signal based on the configuration information by using the resource comprises:
   sending, by the terminal device, the reference signal to at least one other terminal device based on the configuration information by using the resource.

6. The method of claim 1, wherein the determination of the resource based on the public cell identity (PCI) of the cell to which the terminal device belongs comprises:
   calculating, by the terminal device, a resource index of the resource according to a predefined criterion based on the PCI of the cell to which the terminal device belongs; and
   determining, by the terminal device, the resource based on the resource index of the resource, and the resource index is a symbol index of the reference signal, and a value of the symbol index is equal to 4(PCImoc2)+1.

7. The method of claim 1, wherein the determination of the resource based on the public cell identity (PCI) of the cell to which the terminal device belongs comprises:
calculating, by the terminal device, a resource index of the resource according to a predefined criterion based on the PCI of the cell to which the terminal device belongs; and
determining, by the terminal device, the resource based on the resource index of the resource, and
the resource index is a frequency index of the reference signal, the frequency index is a frequency-domain start location of the reference signal in each slot, and a value of the frequency index is equal to PCI mod 3.

8. The method of claim 1, wherein the determination of the resource based on the public cell identity (PCI) of the cell to which the terminal device belongs comprises:
calculating, by the terminal device, a resource index of the resource according to a predefined criterion based on the PCI of the cell to which the terminal device belongs; and
determining, by the terminal device, the resource based on the resource index of the resource, and
the resource index is an OCC index of the reference signal, and a value of the OCC index is equal to PCI mod 2.

9. The method of claim 1, wherein the method further comprises, upon determining that the configuration information indicates that the reference signal is used for interference/channel measurement between terminal devices and the configuration information indicates that the terminal device is a receiver, receiving, by the terminal device, the reference signal sent by another terminal device in a neighboring cell and performing interference/channel measurement between the terminal devices based on the reference signal.

10. A signal transmission method, comprising:
adding, by a network device, configuration information onto a physical channel, wherein the configuration information is configured to instruct a terminal device to send a reference signal, a resource for transmitting the reference signal is determined based on a public cell identity of a cell to which the terminal device belongs, the configuration information is further configured to indicate whether the reference signal is used for interference/channel measurement between terminal devices, and when the configuration information indicates that the reference signal is used for interference/ channel measurement between terminal devices, the configuration information is further configured to indicate whether the terminal device is a sender or a receiver; and
sending, by the network device, the configuration information to the terminal device through the physical channel, to enable the terminal device to send the reference signal based on the configuration information by using the resource to at least one other terminal device in a neighboring cell when the configuration information indicates that the reference signal is used for interference/channel measurement between terminal devices and the configuration information indicates that the terminal device is a sender.

11. The method according to claim 10, wherein the resource used to transmit the reference signal comprises at least one of:
a symbol used to transmit the reference signal, a subcarrier used to transmit the reference signal, a cyclic shift of the reference signal, or an orthogonal cover code of the reference signal.

12. The method according to claim 10, wherein the reference signal is a first-type reference signal and/or a second-type reference signal, the first-type reference signal is a sounding reference signal SRS or a first demodulation reference signal (DMRS), and the second-type reference signal is a channel state information-reference signal (CSI-RS) or a second demodulation reference signal (DMRS).

13. A signal transmission apparatus, comprising:
a transceiver, configured to:
receive configuration information sent by a network device, wherein the configuration information is configured to instruct the signal transmission apparatus to send a reference signal, and a resource for transmitting the reference signal is determined based on a public cell identity of a cell to which the signal transmission apparatus belongs; and
send the reference signal based on the configuration information by using the resource to at least one other signal transmission apparatus in a neighboring cell, and
at least one processor configured to:
after receiving the configuration information, determine the resource based on the public cell identity of the cell to which the signal transmission apparatus belongs; and
send the reference signal by using the resource,
wherein the configuration information is further configured to indicate whether the reference signal is used for interference/channel measurement between terminal devices, and when the configuration information indicates that the reference signal is used for interference/ channel measurement between terminal devices, the configuration information is further configured to indicate whether the terminal device is a sender or a receiver, and
wherein the transceiver is further configured to:
upon determining that the configuration information indicates that the reference signal is used for interference/ channel measurement between terminal devices and the configuration information indicates that the terminal device is a sender, send the reference signal by using the resource.

14. The apparatus according to claim 13, wherein the resource used to transmit the reference signal comprises at least one of:
a symbol used to transmit the reference signal, a subcarrier used to transmit the reference signal, a cyclic shift of the reference signal, or an orthogonal cover code of the reference signal.

15. The apparatus according to claim 13, wherein the reference signal is a first-type reference signal and/or a second-type reference signal, the first-type reference signal is a sounding reference signal (SRS) or a first demodulation reference signal (DMRS), and the second-type reference signal is a channel state information-reference signal (CSI-RS) or a second demodulation reference signal (DMRS).

16. The apparatus according to claim 13, wherein the resource is determined from at least one candidate resource based on the public cell identity of the cell to which the apparatus belongs and a first mapping relationship, the first mapping relationship is used to indicate a correspondence between at least one public cell identity and the at least one candidate resource, and the at least one public cell identity comprises the public cell identity of the cell to which the apparatus belongs.

17. The apparatus according to claim 13, wherein the transceiver is further configured to:
  send the reference signal to at least one other signal transmission apparatus based on the configuration information by using the resource.

18. A signal transmission apparatus, comprising:
  a processor, configured to add configuration information onto a physical channel, wherein the configuration information is configured to instruct a terminal device to send a reference signal, a resource for transmitting the reference signal is determined based on a public cell identity of a cell to which the terminal device belongs, the configuration information is further configured to indicate whether the reference signal is used for interference/channel measurement between terminal devices, and when the configuration information indicates that the reference signal is used for interference/channel measurement between terminal devices, the configuration information is further configured to indicate whether the terminal device is a sender or a receiver; and
  a transmitter, configured to send the configuration information to the terminal device through the physical channel, to enable the terminal device to send the reference signal based on the configuration information by using the resource to at least one other terminal device in a neighboring cell when the configuration information indicates that the reference signal is used for interference/channel measurement between terminal devices and the configuration information indicates that the terminal device is a sender.

19. The apparatus according to claim 18, wherein the resource used to transmit the reference signal comprises at least one of:
  a symbol used to transmit the reference signal, a subcarrier used to transmit the reference signal, a cyclic shift of the reference signal, or an orthogonal cover code of the reference signal.

20. The apparatus according to claim 18, wherein the reference signal is a first-type reference signal and/or a second-type reference signal, the first-type reference signal is a sounding reference signal (SRS) or a first demodulation reference signal (DMRS), and the second-type reference signal is a channel state information-reference signal (CSI-RS) or a second demodulation reference signal DMRS.

* * * * *